(12) United States Patent
Hodjat et al.

(10) Patent No.: US 7,625,290 B2
(45) Date of Patent: Dec. 1, 2009

(54) SLEEVE-TYPE FLEXIBLE SHAFT COUPLING

(75) Inventors: Yahya Hodjat, Oxford, MI (US); Keming Liu, Sterling Heights, MI (US); Lin Zhu, Rochester Hills, MI (US); Marc Cadarette, London (CA)

(73) Assignee: The Gates Corporation, Denver, CO (US)

( * ) Notice: Subject to any disclaimer, the term of this patent is extended or adjusted under 35 U.S.C. 154(b) by 259 days.

(21) Appl. No.: 11/481,320

(22) Filed: Jul. 5, 2006

(65) Prior Publication Data

US 2008/0009354 A1 Jan. 10, 2008

(51) Int. Cl.
*F16D 3/52* (2006.01)

(52) U.S. Cl. .............................. 464/75; 464/88; 464/90

(58) Field of Classification Search .................... 464/47, 464/74, 75, 167, 88–90, 49, 154, 156; 74/640; 474/177

See application file for complete search history.

(56) References Cited

U.S. PATENT DOCUMENTS

| | | |
|---|---|---|
| 1,983,007 A | 12/1934 | Simons |
| 2,952,143 A | 9/1960 | Case |
| 3,055,195 A | 9/1962 | Olson |
| 3,362,191 A | 1/1968 | Louette |
| 3,469,466 A * | 9/1969 | Heathwaite et. al. ........ 474/161 |
| 3,730,009 A * | 5/1973 | Mead et al. |
| 4,078,443 A | 3/1978 | Warner et al. |
| 4,357,137 A * | 11/1982 | Brown ......................... 464/75 |
| 4,473,359 A * | 9/1984 | Davis .......................... 464/88 |
| 5,660,591 A * | 8/1997 | Reynolds ..................... 464/88 |
| 5,908,355 A | 6/1999 | Hoyt, III et al. |
| 6,159,102 A | 12/2000 | Hennessey et al. |
| 6,283,868 B1 | 9/2001 | Clarke et al. |
| 6,671,475 B2 | 12/2003 | Katada et al. |
| 6,726,228 B2 | 4/2004 | Crawford |
| 6,843,727 B2 * | 1/2005 | Counter et al. ................ 464/49 |
| 2003/0186749 A1* | 10/2003 | Hauck ......................... 464/75 |

FOREIGN PATENT DOCUMENTS

EP 499 499 A1 8/1992

* cited by examiner

*Primary Examiner*—Greg Binda
(74) *Attorney, Agent, or Firm*—P. N. Dunlap, Esq.; J. A. Thurnau, Esq.; J. L. Mahurin, Esq.

(57) ABSTRACT

A coupling sleeve for use in a sleeve-type, flexible, shaft-coupling device, having a generally annular body portion with one or more axially extending, polymeric or elastomeric teeth on at least one of its inner and outer periphery and having a rigid support band with a rigid, axially extending fin protruding radially into at least one of the teeth. The coupling sleeve has a cross sectional area with a rigid band portion that occupies the minor portion of the cross section relative to the polymeric portion. Torque applied to the teeth of the coupling sleeve during use is resisted by the fins and the tooth material is thus placed in compression.

17 Claims, 2 Drawing Sheets

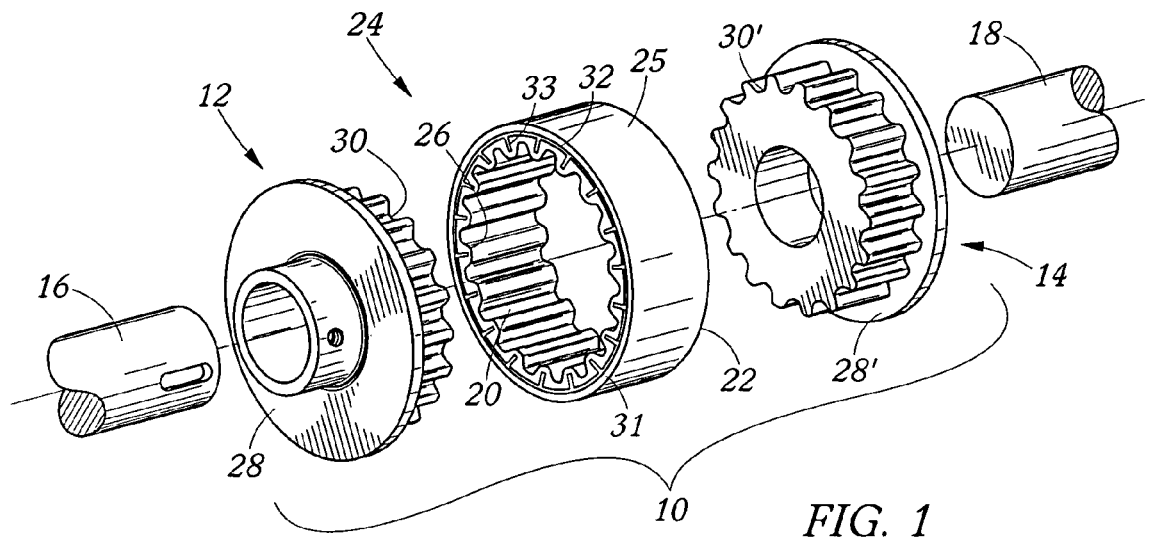
FIG. 1
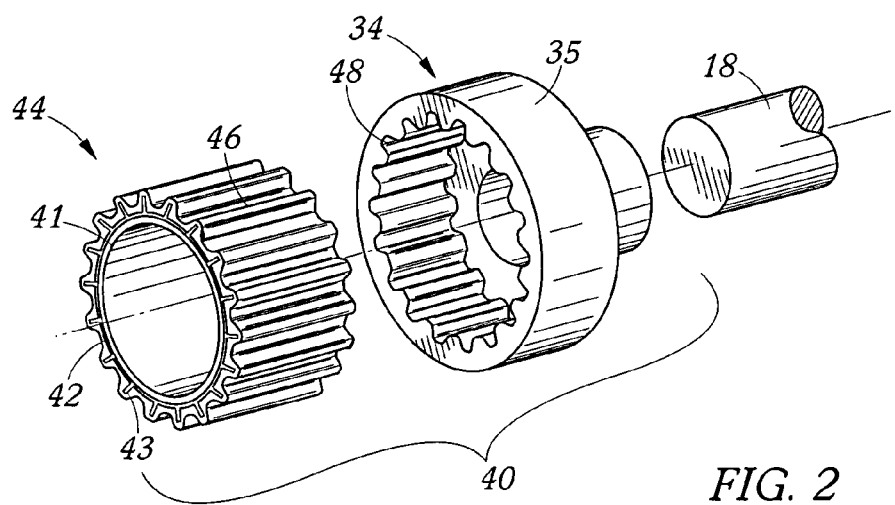
FIG. 2
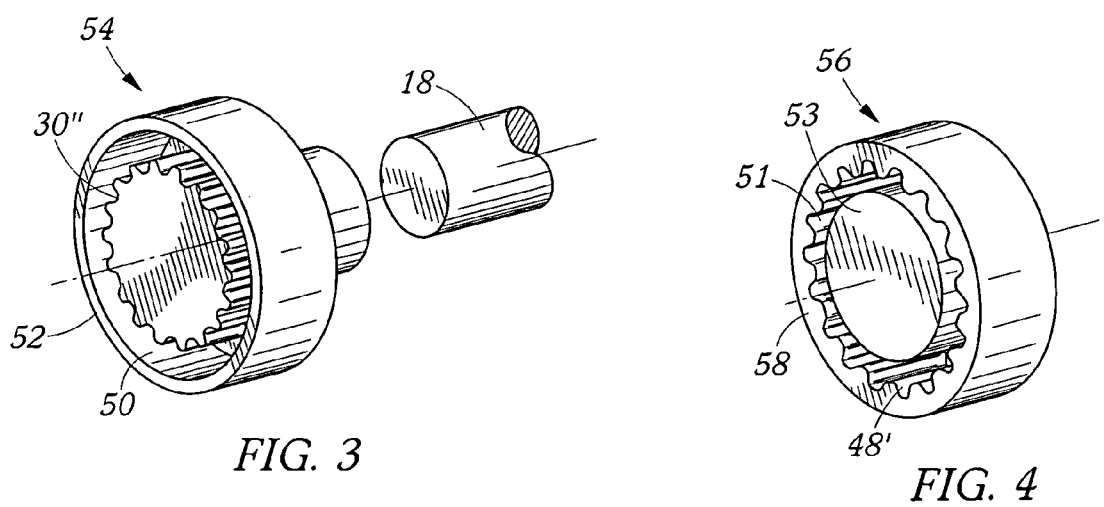
FIG. 3
FIG. 4

SLEEVE-TYPE FLEXIBLE SHAFT COUPLING

BACKGROUND OF THE INVENTION

The present invention relates to a flexible shaft coupling of the sleeve type.

Transferring power or rotational motion through flexible, elastomeric, sleeve-type, shaft couplings is known. Representative of the art are U.S. Pat. Nos. 2,952,143 and 6,671,475. These couplings allow misaligned shafts to effectively connect and transfer power and absorb some vibration. These couplings generally comprise a pair of opposing hubs adapted to attach to two coaxial shafts, and a connecting sleeve extending between and engaging the two hubs. The hubs and sleeves engage via a plurality of axially extending ribs or teeth along at least a portion of the inner periphery of the sleeve for meshing with grooves in oppositely disposed hubs or end pieces to form a flexible coupling assembly. These couplings generally provide some vibration isolation and accommodate some shaft misalignment.

Problems with these flexible sleeve couplings include that elastomer teeth can shear off under a torsional load, the sleeve itself can shear into two pieces in the area intermediate between the two engaged ends, and the sleeve can expand or explode at high speed from centrifugal force. Another problem is the failure to transfer power or motion after one of the aforementioned problems occurs. Known methods to improve tooth shear resistance include to reinforce the elastomer of the sleeve with chopped or continuous fibers, to use higher strength plastics, composites or elastomers, or to reinforce the teeth with fabric. Representative of the art is U.S. Pat. No. 6,283,868. Another approach to strengthen the teeth is to provide rigid projections on the two hubs which overlap or intermesh, with the elastomer engaged between them in compression whenever torque is applied to the coupling, thus changing the mode of coupling altogether as disclosed in U.S. Pat. No. 3,362,191. Known methods to protect the sleeve from centrifugal forces include to reinforce the sleeve with tensile cords as disclosed in U.S. Pat. No. 6,283,868, to provide the hubs with an annular cavity into which the sleeve engages as disclosed in U.S. Pat. No. 5,660,591, and to provide an external metal band as disclosed in U.S. Pat. No. 3,362,191. Known methods to prevent the sleeve from shearing between the hubs include using one inner male hub and one outer female hub with the annular sleeve engaged there between as disclosed in U.S. Pat. No. 4,357,137, and thickening the intermediate region of the sleeve as disclosed in U.S. Pat. No. 6,671,475. A known method to provide fail-safe transmission of power on failure of the elastomer is to provide a rigid engaging element which may be metal coated with elastomer as disclosed in U.S. Pat. No. 5,660,591. Because the elastomer layer is so thin, this fail-safe coupling provides very little flexibility and very little vibration isolation. The use of textile reinforcements complicates the manufacturing of the sleeve, and external metal bands increase the number of discreet parts in the assembly. Annular cavities increase the bulk or complexity of the hubs.

What is needed is an improved sleeve coupling which has improved tooth shear resistance, preferably in a one piece sleeve without complicated manufacturing steps or a plurality of parts. What is needed is an improved elastomeric coupling sleeve which combines vibration isolation and accommodation of shaft misalignment, with high-speed resistance, and increased torque resistance. What is needed is a polymeric, toothed sleeve, integrally reinforced with a rigid material such as a metal band having a plurality of tooth-reinforcing fins or protrusions. What is needed is a shaft coupling assembly wherein a vibration-damping and/or misalignment-absorbing elastomeric sleeve has a rigid reinforcing member that increases the shear resistance of the sleeve by placing the elastomer in some degree of compression during use.

The present invention meets one or more of these needs by providing a metal support along with a polymeric coupling sleeve. The metal support, in the shape of a round band (like a section of tubing) has protruding fins. There is a fin in a coupling tooth. As a result of this metal support, when the coupling is engaged, the tooth polymer undergoes compressive stress, which is the best type of stress for elastomers (in contrast to shear, tensile, and bending stresses). The polymeric material is compressed against the metal fin, rather than undergoing shear stress as in prior art sleeve couplings. The compressive resistance of the polymer improves the isolating properties of the coupling. The polymer can be tuned to obtain the desired stiffness and isolating properties.

BRIEF SUMMARY OF THE INVENTION

The primary aspect of the invention is to provide a coupling sleeve for use in a sleeve-type, flexible, shaft-coupling device, comprising: a generally annular body portion having an inner periphery and an outer periphery; and one or more axially extending, polymeric teeth on at least one of said periphery of said body portion; wherein said body portion comprises a rigid band having a rigid, axially extending fin protruding radially into at least one of said one or more teeth. The coupling sleeve has a cross sectional area comprising a polymeric portion and a rigid band portion, and said rigid band portion occupies the minor portion of said cross section relative to said polymeric portion. Torque applied to the teeth of the coupling sleeve during use is resisted by the fins and the tooth polymer is thus placed in compression at least to some degree.

Another aspect of the invention is to provide a coupling device comprising the coupling sleeve and at least one end piece coupled to said sleeve. The coupling device may comprise a coupling sleeve with internal teeth and two end pieces with external teeth. Alternately, the coupling device may comprise a coupling sleeve with external teeth, and two end pieces with internal teeth. The end pieces may be shaft ends or separate hubs adapted for mounting on shaft ends. The end pieces may have annular receiving portions for the coupling sleeve. The coupling sleeve may be in the form of an insert, fitting in the annular space defined by a male end piece and a female end piece.

Compared to prior art elastomeric coupling sleeves, the coupling sleeve of the present invention having an integral rigid band with fins exhibits increased resistance of the polymeric or elastomeric teeth to shear forces. The rigid band also provides increased resistance to torsional shear stress in the middle portion of the coupling. The rigid band also increases resistance to deformation due to centrifugal force during high-speed operation. Because the rigid band and fins are relatively thin, and the elastomeric portions relatively thick, the coupling can function as a vibration isolator or absorber, and the coupling can accommodate some shaft misalignment. Because the elastomer of the coupling sleeve is in some degree of compression instead of shear or tension, the durability of the elastomer is improved. The reinforced elastomeric coupling sleeve has much higher strength than existing art. The elastomeric coupling sleeve of the present invention is very easy and economical to manufacture while providing superior performance.

Other aspects of the invention will be pointed out or made evident by the following description of the invention and the accompanying drawings.

BRIEF DESCRIPTION OF THE DRAWINGS

FIG. 1 is a perspective, exploded view of an embodiment of the invention.

FIG. 2 is an exploded perspective view of another embodiment of the invention.

FIG. 3 is an exploded perspective view of another embodiment of the invention.

FIG. 4 is an exploded perspective view of another embodiment of the invention.

DETAILED DESCRIPTION OF THE INVENTION

Figure 5:
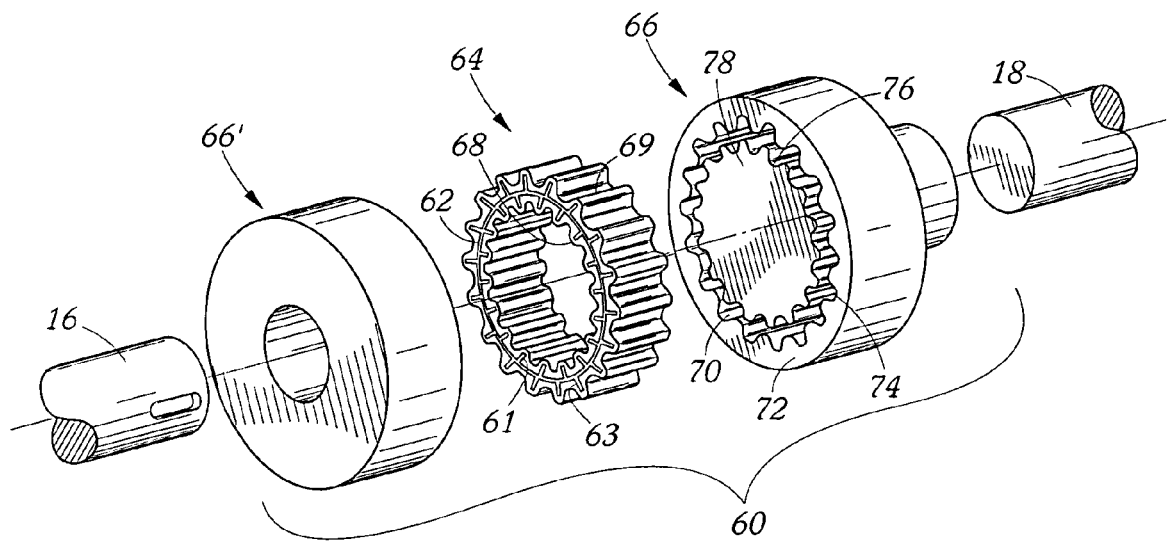
FIG. 5 is an exploded perspective view of another embodiment of the invention.

FIG. 1 shows a flexible shaft coupling device 10 in accordance with an embodiment of the present invention, wherein the coupling device 10 comprises oppositely disposed end pieces 12, 14 to which oppositely disposed shafts 16, 18 or one or more alternative devices may be engaged by any suitable means. The coupling device 10 further comprises a flexible coupling sleeve 24, having a central generally cylindrical annular portion 25 and a coupling receiving portion 20, 22 at either end thereof. The end pieces 12, 14 may be coupled to the coupling receiving portions 20, 22 of the sleeve 24 by any suitable means. The coupling receiving portions 20, 22 include circumferentially spaced axially extending ribs or teeth 26 along at least a portion of the inner periphery of the coupling sleeve 24, which teeth 26 are formed and adapted to mesh with complementary grooves 30, 30' on the outer surface of the end pieces 12, 14. The coupling sleeve 24 is formed of polymeric or elastomeric material integrally associated with a rigid band 32 having fins 33. Each tooth 26 is associated with a reinforcing fin 33 protruding from rigid band 32. The band 32 may optionally be coated with an outer polymeric layer 31.

The details of the end pieces 12, 14 insofar as the means of connection to shafts 16, 18 are not critical to the invention. Thus, a keyway and/or set screw may be provided as in FIG. 1. Likewise, a spline, bevel, bolting flange, clamp, press fit or any other suitable alternate arrangement is possible. FIG. 1 also shows a suitable means of preventing the sleeve from sliding axially in either direction, namely flange 28, 28'. Alternatively, the complementary grooves 30 may be cut completely to and through the end of the end pieces 12, 14 and the sleeve 24 can be kept from sliding off by other means, such as snap rings, or a thickened central annular portion on the inner periphery of the sleeve.

FIG. 2 shows a flexible shaft coupling device 40 in accordance with another embodiment of the present invention, wherein the coupling device 40 comprises oppositely disposed end pieces 34 (and a second one not shown) to which oppositely disposed shafts 18 (and 16, not shown) or one or more alternative devices may be engaged by any suitable means. The coupling device 40 further comprises a flexible coupling sleeve 44, having a central generally cylindrical annular portion 35. The end piece 34 may be coupled to the coupling sleeve 44 by any suitable means. The coupling sleeve includes circumferentially spaced axially extending ribs or teeth 46 along at least a portion of the outer periphery of the coupling sleeve 24, which teeth 26 are formed and adapted to mesh with complementary grooves 48 on the inner surface of the end piece 34. The coupling sleeve 44 is formed of polymeric or elastomeric material integrally associated with a rigid band 42 having fins 43. Each tooth 46 is associated with a reinforcing fin 43 protruding radially outward from rigid band 42. The band 42 may optionally be coated with an inner polymeric layer 41.

FIG. 3 shows another embodiment of an end piece 54 which may be substituted for the end piece 12 and/or 14 in the coupling device 10 of FIG. 1. End piece 54 has similar complementary grooves 30" on the outer surface, adapted to mesh with teeth 26 of coupling sleeve 24. In addition, end piece 54 has an annular coupling receiving space 50 defined by the surface containing grooves 30" and the inner surface of cylindrical portion 52. In another embodiment, shown in FIG. 4, a similar annular coupling receiving space 51 may be adapted for use with the outer-toothed coupling sleeve 44 of FIG. 2. Thus, FIG. 4 shows an end piece 56 having annular space 51 defined by the outer surface of cylindrical portion 53 and the inner surface of outer cylindrical portion 58 which has grooves 48' for receiving coupling teeth 46.

In another embodiment, the coupling sleeve may be double-sided as shown in FIG. 5. Referring to FIG. 5, coupling device 60 comprises double-sided coupling sleeve 64 and end pieces 66, 66'. Sleeve 64 is generally cylindrical and has teeth 69 on its outer periphery and teeth 68 on its inner periphery. Reinforcing band 62 has outwardly protruding fins 63 associated with outer teeth 69, and inwardly protruding fins 61 associated with inner teeth 68. Thus both sets of teeth are reinforced and the polymer or elastomer which forms the teeth of the sleeve is compressed against the fins when a torsional load is applied to the teeth. The end pieces 66, 66' each have an annular space 70 for receiving an end of the coupling sleeve. Annular space 70 is defined by outer portion 72 having grooves 74 for mating with outer teeth 69, and by inner portion 78 having grooves 76 mating with inner teeth 68. As in other embodiments, the end pieces are adapted for mounting onto shaft ends 16, 18 or onto other forms of rotating mechanical devices.

Figure 6:
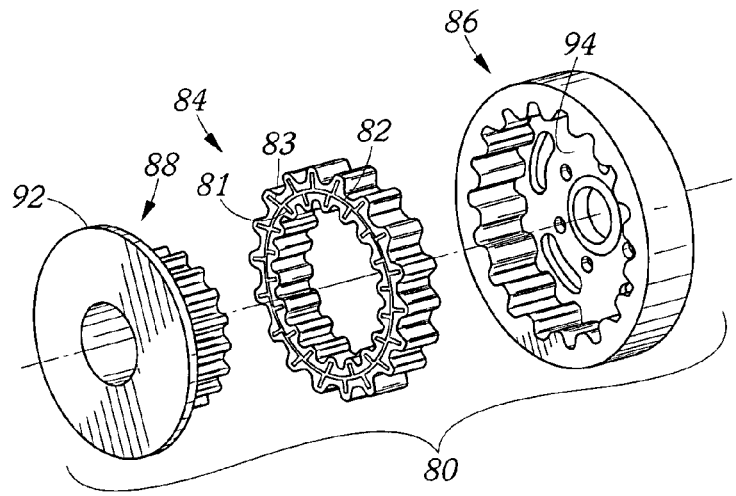
FIG. 6 is an exploded perspective view of another embodiment of the invention.

In yet another embodiment, coupling device 80 shown in FIG. 6 has a coupling sleeve 84 that is similar to the double-sided sleeve 64, but the end pieces comprise a female or outer end piece 86 and a male or inner end piece 88. Coupling sleeve 84 has a rigid reinforcing band 82 with inner fins 81 and outer fins 83 reinforcing the polymeric or elastomeric teeth of the sleeve. In use, the sleeve 84 is inserted into the annular space defined by the male and female end pieces when the two end pieces are brought into proximity with each other. The end pieces may have means, such as flange 92 and/or web 94 for preventing the double-sided coupling sleeve or insert 84 from sliding out of the annular space. Web 94 has various holes, including a center bolt hole and a series of smaller bolt holes to illustrate that various means of attachment to other mechanical components are possible. Alternately, male end piece 88 may be a grooved shaft end, and/or female end piece 86 may be a hollowed out, grooved shaft end.

The fins may be of such a protruding dimension that even in the absence of the polymeric or elastomeric teeth, there is engagement between the fins and the grooves of the end pieces. Such an interference design permits some degree of coupling device operability even in the event of severe polymer wear, debonding, or other polymer or elastomer failure.

The polymeric material of the coupling sleeve may comprise any suitable plastic, thermoplastic, or elastomeric material, including blends thereof. Particularly for applications requiring some vibration damping or isolation and/or significant misalignment, an elastomeric sleeve material is preferred. An elastomeric sleeve material may comprise any suitable rubber, thermoplastic elastomer ("TPE"), or crosslinked elastomeric material. The polymeric or elastomeric material may be tuned by adjusting stiffness, modulus, damping, and/or dynamic properties and the like by rubber or plastic compounding methods known in the art to provide a desired vibration isolation or damping function. Useful elastomers include cast or milled polyurethanes, ethylene-alpha-olefin elastomers, diene rubbers, hydrogenated or saturated nitrile or diene elastomers, acrylate and acrylic elastomers, fluoro-elastomers, silicones, and the like, and blends thereof. As known in the art, the polymer material or elastomeric material may advantageously comprise one or more fillers, plasticizers, antioxidants, process aids, adhesive adjuvants, curatives, short fibers or the like.

Figure 7:
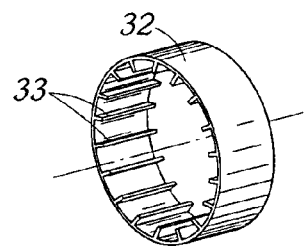
FIG. 7 is a perspective view of a rigid insert according to an embodiment of the invention.

FIG. 7 illustrates an embodiment of a rigid band for reinforcing a coupling sleeve according to the invention. Band 32 has fins 33. The rigid band with its fins may be formed of any suitably rigid and formable material. The rigid band insert can be any metal or alloy. In a preferred embodiment the rigid band is a tubular aluminum extrusion with fins. The tubing may be extruded and then cut to size. The polymeric material or elastomer is either molded or wrapped around it. The band may be placed in a suitable mold and over-molded with the polymeric or elastomeric sleeve material. Also, it is possible to mold or wrap the plastic or elastomer around a long portion of tubing and then cut the assembly to any size desired for the coupling sleeve. To enhance the bond between polymer and rigid insert, an adhesive may be used, or a self-bonding plastic or adhesive elastomer formulation may be used. For example, the adhesive may be a rubber-to-metal adhesive such as those sold under the Chemlok trademark by Lord Corporation. Examples of adhesive elastomer formulations are disclosed in U.S. Pat. Nos. 5,776,294 and 5,300,569. Useful examples of self-bonding elastomer formulations suitable for vibration damping and coupling applications are described in U.S. Pat. Publication No. 2002/0162627.

The polymeric tooth material could comprise a single composition, or it could comprise layers of different compositions for different purposes and effects. For example, a surface layer of wear-resistance polymeric material may be provided with a sleeve body of vibration damping material. Also for example, a surface layer of reinforcing fabric may be provided, for example for wear resistance. Many other such adaptations are contemplated as being within the scope of the invention.

The end pieces may be formed of any suitable material by known methods, such as compression, transfer, or injection molded plastic or composite material, cast or machined or spun metal, or the like. End pieces may be assemblies of component parts such as hubs, flanges, keys, bolts, or the like.

The coupling sleeve and end pieces may have a plurality of teeth which share and distribute the torsional loads. The teeth may be triangular, trapezoidal, curvilinear, sinusoidal, or of any shape and number suitable for the design loads of the coupling device. The sleeve has a cross sectional area comprising an elastomeric or polymeric portion and a rigid band portion, and generally, the rigid band portion occupies the minor portion of said cross section relative to the elastomeric portion. The greater the portion of the cross section occupied by the band and its associated fins, the greater the strength and/or resistance to shear forces of the coupling sleeve. The greater the portion of the cross section occupied by an elastomeric material, the greater will be the vibration isolation characteristic and misalignment tolerance characteristic of the coupling sleeve. Also, in order to have acceptable isolation function and connection under misalignment, fewer fins may be used, therefore accommodating thicker elastomeric teeth. It is contemplated that at least one polymeric tooth is reinforced by a rigid fin. The pitch, spacing, number, or profile of the teeth of the outer periphery of a double-sided coupling sleeve may be either the same or different from the pitch, spacing, number, or profile of the teeth of the inner periphery. Thus, the inventive coupling device may accommodate a variety of design requirements.

The coupling device of the present invention can be used in a wide variety of automotive, non-automotive, and industrial applications, especially those requiring high durability, vibration absorption or isolation, and accommodation of some shaft misalignment. The coupling device can provide power transmission between two misaligned shafts. The coupling device can be a vibration damper or vibration isolator. The coupling device can drive a gear, belt, or chain in a power transmission system. The coupling device may attach a crankshaft to an electric or hydraulic generator, to a transmission, or to other shaft-driven devices. The ability to handle misalignment and absorb/isolate some vibrations makes this coupling very suitable for vehicles operating in harsh conditions with structural twisting and bending resulting in a high possibility of misalignment between different connected components. The coupling device can also be used to locate automotive accessory drive components (such as power steering pump, water pump, air conditioning, etc.) away from the front of the engine, connecting such components by shafts through this coupling. The high durability of this coupling makes it very suitable for all types of automotive applications. This coupling can be used in many other industrial and automotive applications such as machine tools, mining equipment, agricultural, and construction equipment to name a few.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A coupling sleeve for use in a sleeve-type or annular insert-type, flexible, shaft-coupling device, comprising: a generally annular body portion having an inner periphery and an outer periphery; and one or more axially extending, polymeric teeth on at least one of said periphery of said body portion; wherein said body portion comprises a reinforcing band having a reinforcing, axially extending fin protruding radially into at least one of said one or more teeth.

2. The coupling sleeve of claim 1, wherein said sleeve has a cross sectional area comprising a polymeric portion and a rigid band portion, and said rigid band portion occupies the minor portion of said cross section relative to said polymeric portion.

3. The coupling sleeve of claim 1, wherein said one or more teeth are elastomeric, and wherein torque applied to said teeth during use is resisted by said fins and said tooth elastomer is thus placed in some degree of compression.

4. The coupling sleeve of claim 1, wherein said rigid band is formed of metal.

5. The coupling sleeve of claim 1, wherein said rigid band with fin or fins is an aluminum extrusion.

6. The coupling sleeve of claim 1, wherein the teeth are only on the inner periphery.

7. The coupling sleeve of claim 1, wherein the teeth are only on the outer periphery.

8. The coupling sleeve of claim 1, wherein the teeth are on both the inner periphery and the outer periphery.

9. A coupling device comprising the coupling sleeve of claim 1 and at least one end piece coupled to said sleeve; said band, fin, and teeth of substantially the same axial dimension as said sleeve.

10. The coupling device of claim 9 wherein said end piece comprises a series of axially extending grooves which are complementary forms of said teeth of said coupling sleeve and are adapted for engagement of the end piece with the coupling sleeve.

11. The coupling device of claim 9 wherein the teeth are only on the inner periphery of the coupling sleeve.

12. The coupling device of claim 9 wherein the teeth are only on the outer periphery of the coupling sleeve.

13. The coupling device of claim 9 wherein teeth are on both the inner periphery and the outer periphery of the coupling sleeve.

14. A coupling device comprising: the coupling sleeve of claim 1 in the form of an annular insert; a male coupling member; and a female coupling member;

wherein the sleeve has elastomeric teeth on both the inner periphery and the outer periphery;

wherein said rigid band has inwardly protruding fins reinforcing the elastomeric teeth on the inner periphery and outwardly protruding fins reinforcing the teeth on the outer periphery; said band, fins, and teeth of substantially the same axial dimension as said sleeve;

wherein the male coupling member has grooves on an external surface that mate with the teeth on the inner periphery; and wherein the female coupling member has grooves on an internal surface that mate with the teeth on the outer periphery.

15. A coupling sleeve for use in a sleeve-type or annular insert-type, flexible, shaft-coupling device, comprising: a generally annular body portion having an inner periphery and an outer periphery; and one or more axially extending, polymeric teeth on at least one of said periphery of said body portion; wherein said body portion comprises a reinforcing band with at least one fin; said fin protruding radially from said band into at least one of said teeth; and wherein the axial extent of said band and of said fin is substantially the axial extent of said teeth.

16. The coupling sleeve of claim 15 wherein the axial extent of said band, fin and teeth is substantially the axial extent of said sleeve.

17. The coupling sleeve of claim 16 wherein said band with said fin is an extrusion without perforations or serrations.

* * * * *

UNITED STATES PATENT AND TRADEMARK OFFICE
CERTIFICATE OF CORRECTION

PATENT NO.       : 7,625,290 B2                                          Page 1 of 1
APPLICATION NO.  : 11/481320
DATED            : December 1, 2009
INVENTOR(S)      : Hodjat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-sixth Day of October, 2010

David J. Kappos
*Director of the United States Patent and Trademark Office*